June 30, 1970  R. W. TACCONE  3,517,728
APPARATUS FOR MAKING CASTINGS
Filed Sept. 18, 1967  5 Sheets-Sheet 1
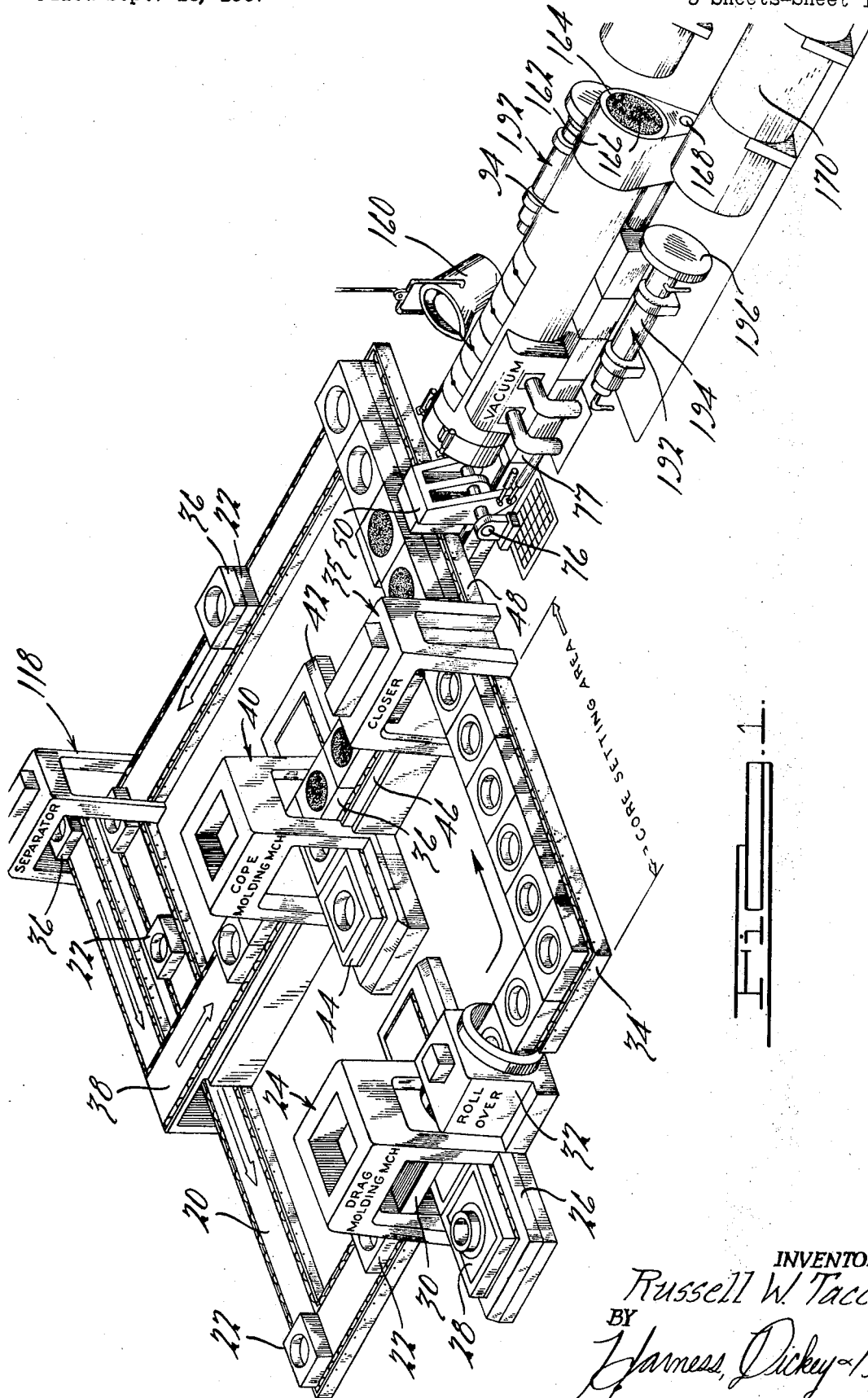
INVENTOR.
Russell W. Taccone
BY
Harness, Dickey & Pierce
ATTORNEYS.

INVENTOR.
Russell W. Taccone
BY
Harness, Dickey & Pierce
ATTORNEYS.

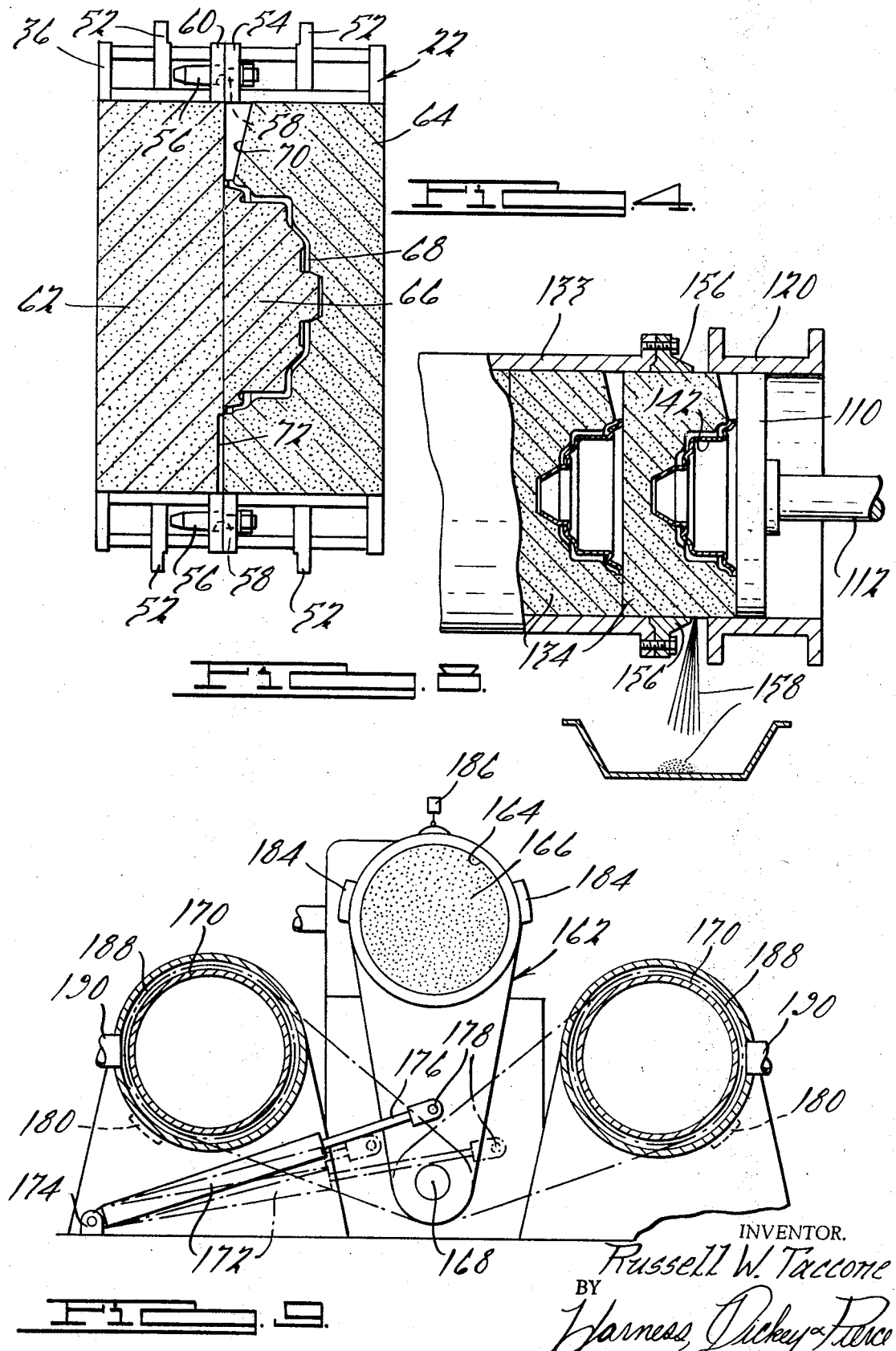

June 30, 1970 R. W. TACCONE 3,517,728
APPARATUS FOR MAKING CASTINGS
Filed Sept. 18, 1967 5 Sheets-Sheet 4
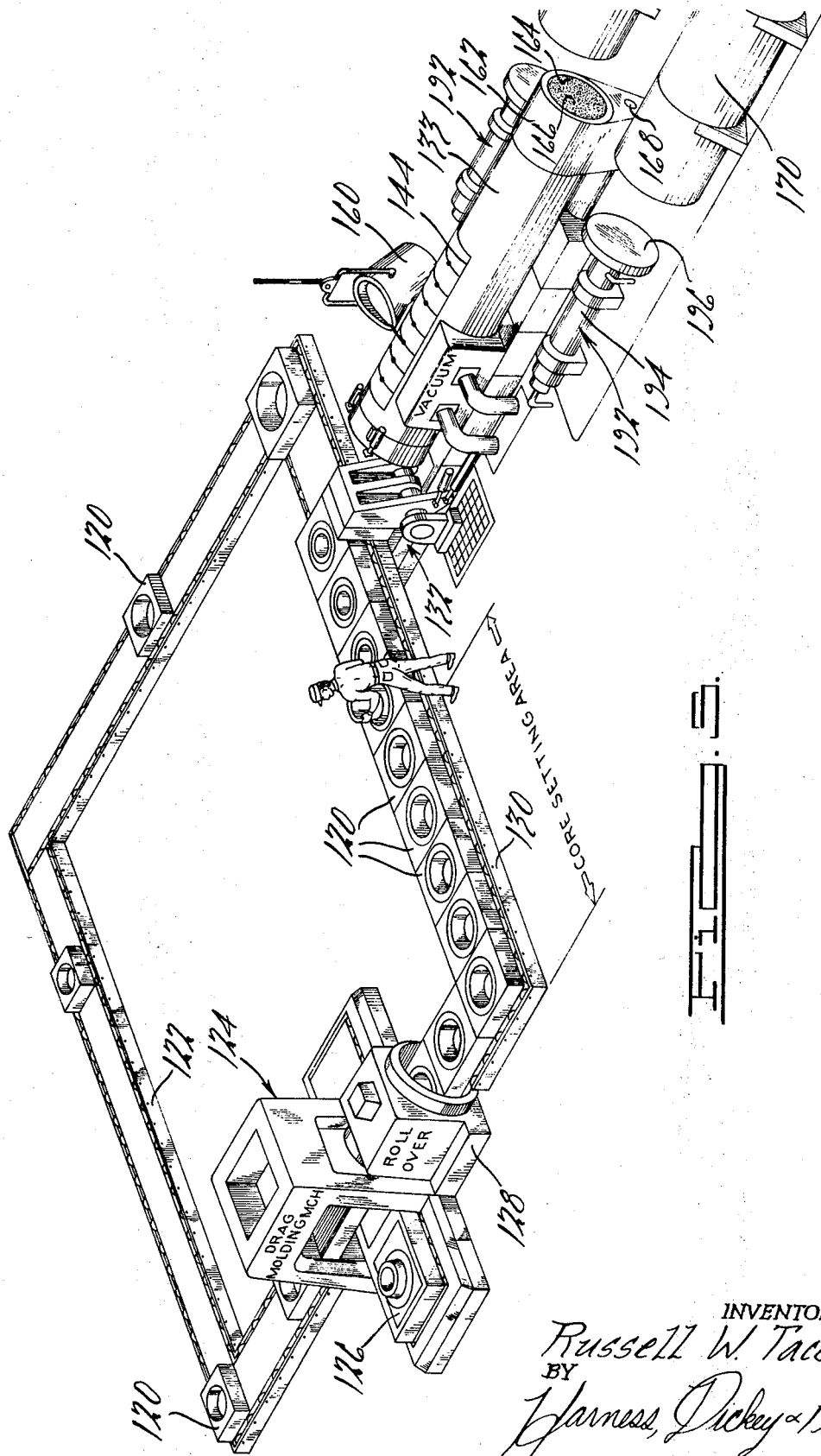
INVENTOR.
Russell W. Taccone
BY
Harness, Dickey & Pierce
ATTORNEYS

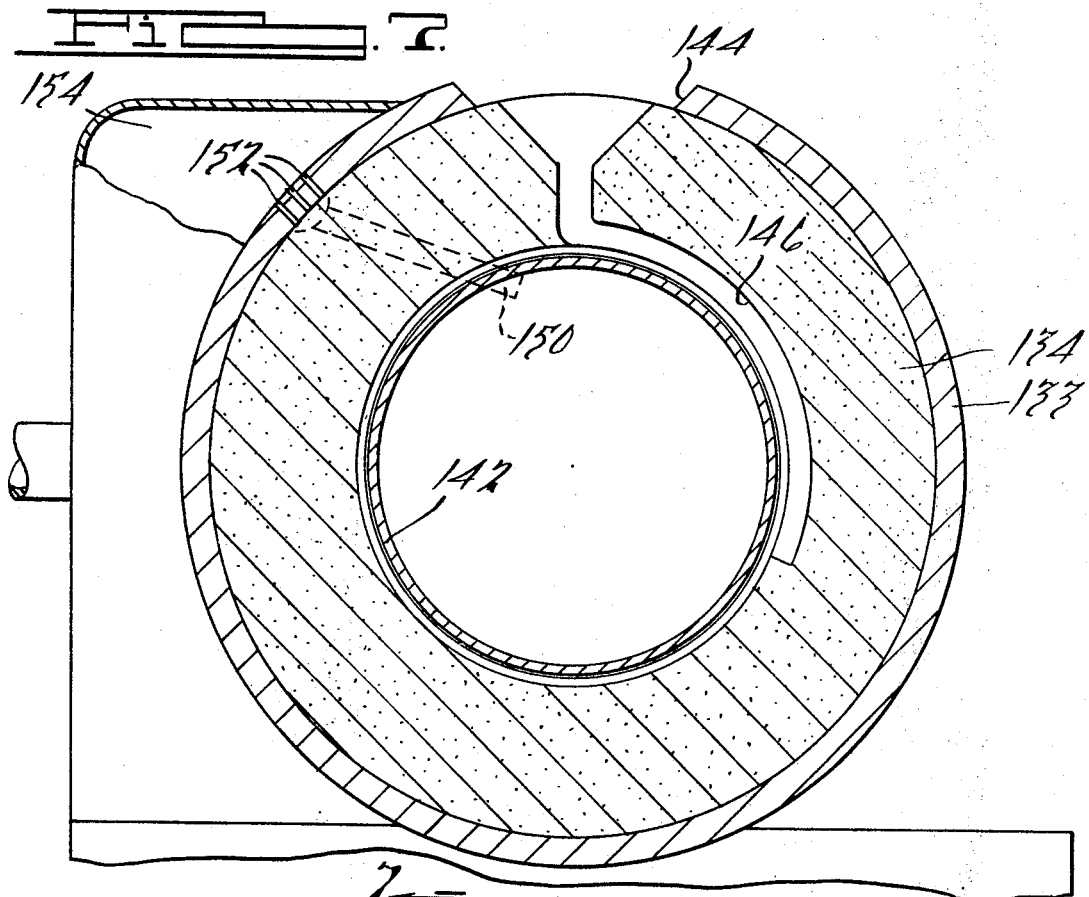
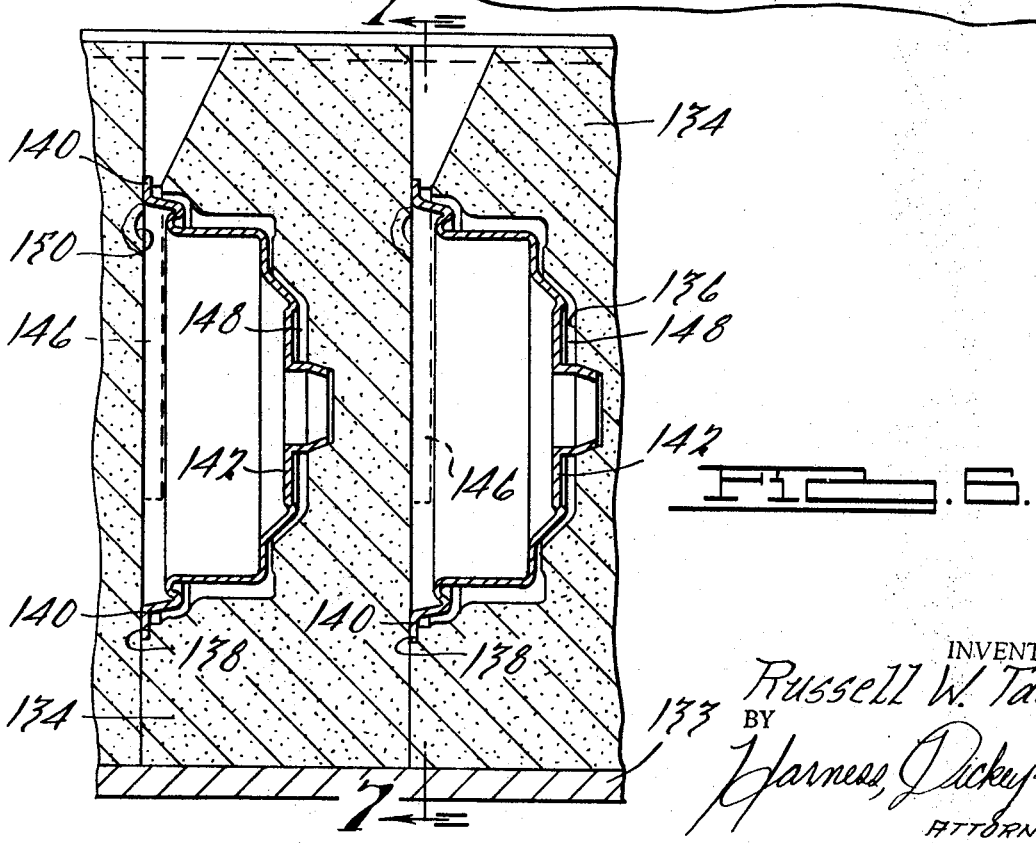

//span>
United States Patent Office 3,517,728
Patented June 30, 1970

3,517,728
APPARATUS FOR MAKING CASTINGS
Russell W. Taccone, Erie, Pa., assignor to Kelsey-Hayes Company, a corporation of Delaware
Filed Sept. 18, 1967, Ser. No. 674,044
Int. Cl. B22d 27/16
U.S. Cl. 164—255         13 Claims

ABSTRACT OF THE DISCLOSURE

An apparatus and method for making castings which consist of successively forming a drag of a compacted green sand mixture having a cavity therein of a preselected pattern and disposed in an open ended flask, successively transferring the flasks by a transfer device into alignment with the inlet end of a casting tube adapted to guidably support a plurality of the molds disposed in face-to-face abutting relationship and pressing the mold from the flask in a manner to effect a trimming of the periphery of the mold to correspond with and to provide a sliding sealing fit with the inner surface of the casting tube, pouring molten metal into the cavities of the molds while disposed in stacked face-to-face abutting relationship within the casting tube and thereafter successively ejecting and transferring the filled molds to an elongated cooling tube provided with cooling means for accelerating the removal of heat from the molds. In some aspects of the apparatus and method comprising the present invention, a subatmospheric pressure is applied to the periphery of the molds while in the casting tube for removing gaseous products formed during the casting operation. An improved mold is also described which consists of a mass of compacted green sand having a core of a thin walled shell of bonded sand disposed in overlying relationship on one face thereof providing porosity and precision in castings heretofore unobtainable.

Background of the invention

New materials and manufacturing techniques have occasioned a revolution in foundry practices for making molds and metal castings. The impetus of automation and new sand bonding materials has enabled major changes to occur in the foundry for manufacturing molds and metal castings at a rate and of a quality heretofore considered unattainable. Of the various processes heretofore used or proposed for use, only relatively few have been given commercial consideration due to various disadvantages either in the mold making phase or in the speed and quality of the castings produced thereby. For example, in prior art processes proposing the use of stacked molds, limitations on the residence time of the cast metal in the mold cavities has caused a limitation in the speed of mold production and casting manufacture or, alternatively, has caused excessive compressive loads to be imposed on the molds causing distortion and fracture thereof with a corresponding distortion or imperfection in the resultant cast part. The economic advantages attending the manufacture of precision castings which substantially reduce the number and duration of further machining operations has occasioned a need for improved foundry techniques in comparison to those heretofore proposed.

The apparatus and method comprising the present invention provide the combined benefits of a high speed mold making and casting operation necessitating minimal labor and control with the ability of producing precision castings requiring only minimal additional machining for manufacturing a finished product.

Summary of the invention

The foregoing and other objects and benefits of the present invention are achieved by an apparatus and a method for making sand molds and metallic castings wherein the preliminarily formed molds are successively pressed from an open ended mold box or flask into the inlet end of an elongated casting tube that has a cross sectional size smaller than that of the cross sectional size of the mold. Accordingly, a trimming or shaving of the mold occurs wherein it is positioned in precise registration with the inner surface of the casting tube assuring proper registry of the mold pattern therein. In addition, the molds are preferably constructed so as to incorporate channels or apertures therethrough disposed in communication with the mold cavity and the periphery of the mold whereby subatmospheric pressure can be applied to the mold cavity for withdrawing any gases evolved or produced during the delivery of molten metal into the mold cavity. The apparatus and method are applicable to so-called two-piece molds comprising a paired cope and drag which define between the mating surfaces thereof a cavity of a preselected pattern; individual molds having preselected configurations on the opposed faces thereof which, when disposed in face-to-face abutting relationship form at their adjoining faces cavities of a preselected configuration; and individual molds incorporating in one face thereof a depression overall or a portion of which a precision thin wall shell-type core is disposed defining a cavity of an accurate configuration. The successive pressing of molds into the casting tube in which the molds are filled with molten metal is accompanied by an intermittent and successive ejection of a filled mold from the exit end of the casting tube which, by a transfer device, is transferred into alignment with alternate ones of a plurality of cooling tubes in which the molds are successively stacked enabling a proper degree of cooling thereof. The resultant cooled molds are successively discharged from the exit end of the cooling tubes and the castings are removed therefrom while the reusable portion of the sand is recovered and recycled back to the molding operation.

Other objects and advantages of the present invention will become apparent upon a reading of the description of the preferred embodiments of the present invention taken in conjunction with the accompanying drawings.

Brief description of the drawings

FIG. 1 is a perspective view partly diagrammatic illustrating an arrangement of the apparatus in accordance with one embodiment of the present invention for making two-piece paired molds;

FIG. 4 is a transverse sectional view through a mold comprising a cope and drag and a core disposed in open ended paired flasks prior to injection into the casting tube;

FIG. 5 is a perspective view partly diagrammatic illustrating an apparatus for making molds employing individual sand molds and precision core in accordance with an alternative embodiment of the present invention;

FIG. 6 is a fragmentary longitudinal sectional view of a plurality of sand molds incorporating precision cores disposed in face-to-face abutting relationship in the casting tube;

FIG. 7 is a transverse vertical sectional view through the mold and casting tube shown in FIG. 6 and taken along a line 7—7 substantially adjacent to the mating faces of adjacent sand molds;

FIG. 8 is a fragmentary side elevational view partly in section illustrating the trimming of the periphery of the mold during the pressing thereof into the inlet end of the casting tube, and FIG. 9 is a fragmentary elevational view partly in section, illustrating alternative positions of the second transfer device for transferring filled molds from the casting tube to the inlet end of the cooling tube.

Description of the preferred embodiments

Figure 3:
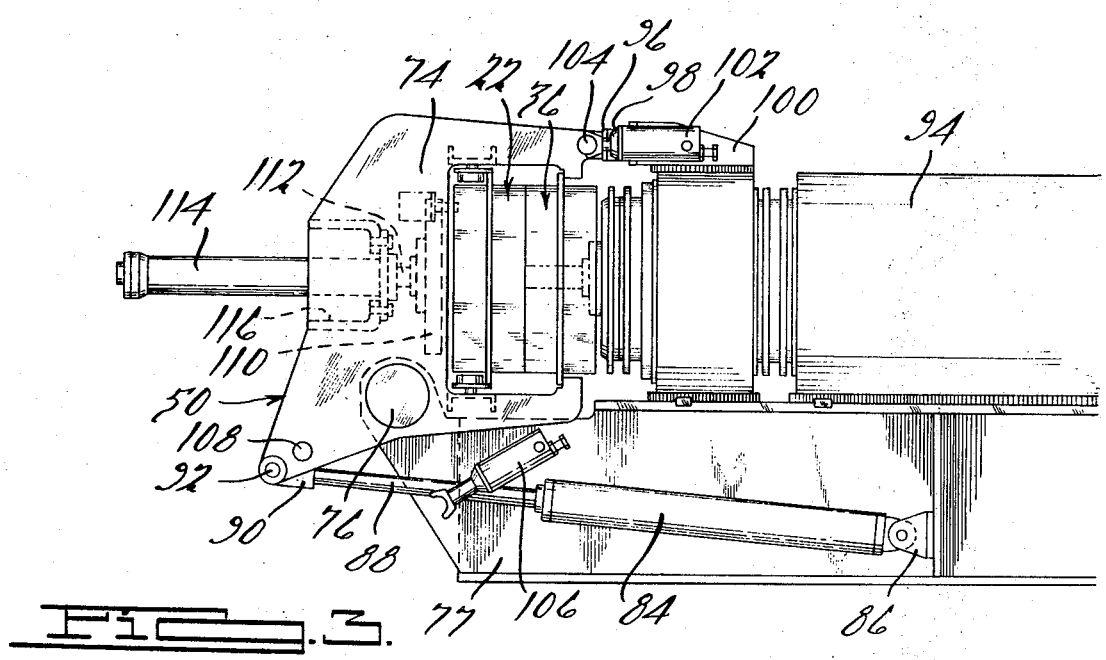
FIG. 3 is a fragmentary side elevational view similar to that shown in FIG. 2 with the transfer device in the operative position for pressing a mold from a flask into the inlet end of the casting tube.

Referring now in detail to the drawings and as may be best seen in FIG. 1, an illustrative embodiment of the present invention comprises an integrated apparatus for making molds and transferring them over suitable conveyor means to a transfer device which in turn is operative for injecting the molds into the inlet end of a casting tube. The specific apparatus as illustrated in FIG. 1, is applicable for forming sand molds of the type comprising two mold halves designated as a drag and cope which are adapted to be paired together incorporating a suitable core, if desired, for forming a mold cavity of a requisite configuration. A typical mold of this type is illustrated in FIG. 4.

The apparatus as illustrated in FIG. 1, comprises a belt or other suitable conveyor 20, which moves in the direction of the arrow for transferring mold boxes or drag flasks 22 to the inlet side of a drag molding machine 24. The drag molding machine includes a base 26 on which a pattern board 28 is supported for providing an appropriate depression of a preselected configuration in a sand mold. The drag molding machine includes a suitable ram 30 for compacting a green sand mixture of any of the types well known in the art, within the interior of the drag flask 22 when disposed in overlying registered relationship on the pattern board 28. The drag flask having the compacted and contoured sand mixture therein is stripped from the pattern board 28, and thereafter passes from the drag molding machine into an inverter or roll-over device 32, whereby the drag flask is rotated 180° to an inverted position and passes along a conveyor 34 in the direction of the arrow along a core setting area as indicated in FIG. 1. In the core setting area, an operator or an apparatus (not shown) is effective to insert a core in the cavity formed in the drag for a purpose well known in the art. The drag flasks thereafter pass into a closing machine 35 in which each drag flask is aligned and united with a cope flask 36.

The cope flasks or mold boxes 36 are similarly filled with a compacted green sand mixture in response to being moved by a conveyor 38 into the inlet side of a cope molding machine 40 including a base 42 on which suitable pattern boards 44 are mounted. The interior of the cope flasks 36 are similarly filled with a compacted green sand mixture, after which they are transferred by a conveyor 46 to the closing machine 35.

The closing machine 35 performs the function of pairing a filled drag flask with a filled cope flask in appropriate relative alignment, whereafter each paired assembly is transferred on a conveyor 48 to a transfer device 50. The aligned relationship of the filled cope flask and filled drag flask is best seen in FIG. 4. As shown, the drag flask 22 and cope flask 36 are formed with laterally-extending webs 52 for engagement with aligning means on the transfer device subsequently to be described. The mating flange 54 on the drag flask is provided with a longitudinally-extending pin 56 which is adapted to be disposed in bearing contact with the surface of a bore 58 formed in a corresponding mating flange 60 on the cope flask 36. In accordance with this arrangement, appropriate registration of the sand cope 62 is maintained relative to the sand drag 64 and a preshaped core 66 disposed therebetween.

As will be noted in FIG. 4, the opposing faces of the core 66 and the drag 64 define a cavity 68 which is adapted to receive molten metal for forming a casting of a corresponding configuration. In the specific embodiment illustrated in FIG. 4, the drag is formed along its mating face with a sprue 70 through which molten metal is adapted to be introduced into the cavity 68. In accordance with a further embodiment of the present invention, the mating faces of the cope 62 and/or drag 64 are provided with a plurality of radial grooves 72 which extend from a position in communication with the cavity 68 to a position in communication with the periphery of the mold. The radial grooves 72 are of a diameter which provide free access for the escape of gases from the mold cavity which are formed during the casting operation but are of a size which inhibits the passage of molten metal therethrough. The provision of such radial grooves also enables the application of subatmospheric pressures to the mold cavity facilitating the withdrawal of gaseous constituents therefrom and thereby assuring a resultant cast article substantially devoid of any blow holes or pockets therein.

In the exemplary embodiment as shown in FIGS. 1 through 4, the configuration of the cavity corresponds to that of a dish-shaped cylindrical object which is typical of a vehicle brake drum. In addition, the drag 64 and cope 62 are of a circular configuration but it will be appreciated that alternative mold cavity shapes and other regular or irregular peripheral mold shapes can also be satisfactorily employed in the practice of the present invention.

Figure 2:
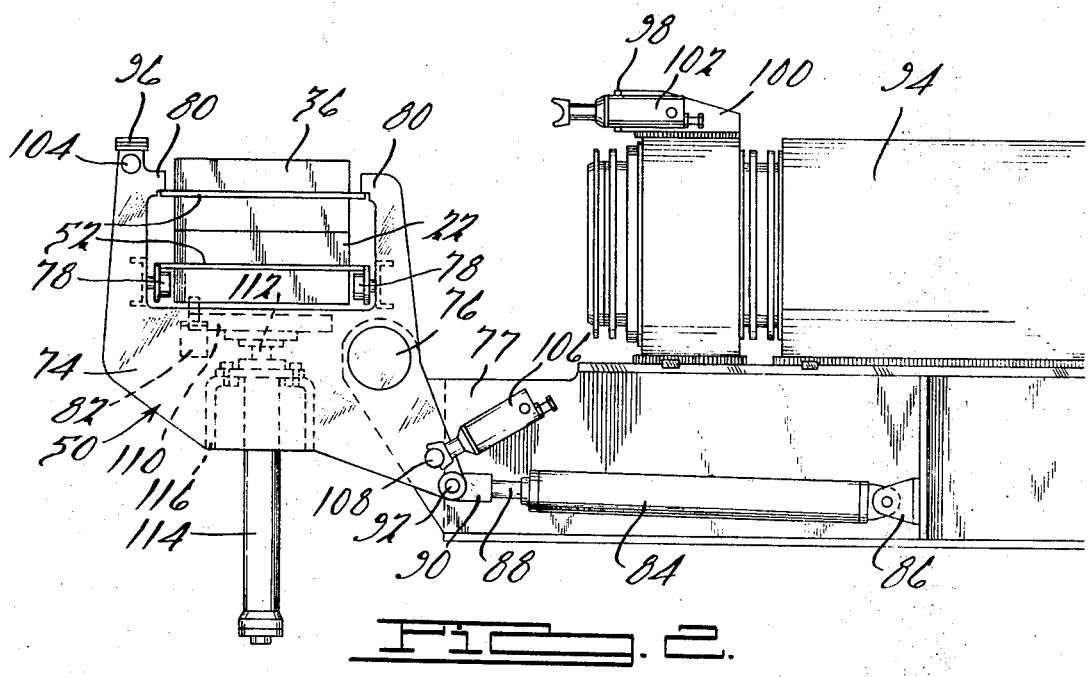
FIG. 2 is a fragmentary side elevational view of a transfer device incorporating an ejector thereon positioned in a loading position.

The transfer device 50, as shown in FIGS. 1 through 3, is movable from a load position as shown in FIG. 2 to an operative position angularly tilted from the load position corresponding to that shown in FIG. 3. In the load position shown in FIG. 2, the bed 74 of the transfer device is oriented in alignment with the conveyor 48 (FIG. 1) so as to receive pairs of cope and drag flasks filled with compacted green sand. The bed 74 is pivotally mounted on a shaft 76 extending longitudinally of the conveyor 48 which in turn is rigidly supported on a framework 77. The bed 74 is formed at its upper surface as viewed in FIG. 2, with a U-shaped channel to the opposing side surfaces of which flanged rollers 78 are rotatably mounted. The flanged rollers 78 are operative to engage the lower surface and side edges of the web 52 on the drag flask 22 maintaining it in appropriate vertical and lateral position. Similarly, the upper edges of the U-shaped portion of the bed 74 are formed with opposing notched engaging arms 80 which are adapted to overlie the upper edge surfaces of the webs 52 of the cope flask 36. A suitable stop 82 is also provided for maintaining the cope and drag flask assembly in appropriate lateral relationship relative to the bed of the transfer device.

Movement of the transfer device from the load position as shown in FIG. 2 to the operative position as shown in FIG. 3, is achieved by a double-acting fluid actuated cylinder 84 having its blank end pivotally connected to a bracket 86 affixed to the framework 77 and its piston rod 88 connected by means of a clevis type fitting 90 to a pin 92 affixed to the bed 74 at a point spaced from the shaft 76. A suitable source (not shown) of a pressurized fluid is provided for alternately causing the piston rod 88 to reciprocate from the position shown in FIG. 2 to the position as shown in FIG. 3. Energization of the cylinder 84 can be achieved manually or automatically in accordance with means well known in the art.

In response to energization of the cylinder 94, the transfer device moves toward the operative position as shown in FIG. 3 and suitable coacting means are provided adjacent to the inlet end of a pouring or casting tube 94 for orienting the axis of the cope and drag flasks relative to the axis of the casting tube. In the exemplary embodiment illustrated the coacting means comprise a pressure pad 96 affixed to the upper leg of the U-shaped portion of the bed 74 which is adapted to be disposed in firm abutting relationship against a stop pad 98 affixed to a bracket 100 mounted on the upper surface of the casting tube.

Suitable cushioning means comprising a cylinder 102 mounted on the bracket 100 and adapted to coact with a pin 104 on the bed adjacent to the pressure pad 96 are provided for eliminating the shock of engagement. A similar cushioning assembly comprising a cylinder 106 and a pin 108 is provided for absorbing any shock loading during the movement of the transfer device of the load position (FIG. 2).

With the transfer device in the operative position as illustrated in FIG. 3, the cope and drag are concurrently pressed from the interior of the cope flask 36 and drag flask 22 and are transferred into the inlet end of the casting tube 94. This transfer is accomplished by means of an ejector comprising a pressure pad 110 affixed to the end of a piston rod 112 of a press cylinder 114 which is securely attached to brackets 116 on the bed 74 of the transfer device. In accordance with this mounting relationship the thrust axis of the pressure pad or ram 110 is in alignment with the axis of the casting tube 94 when the transfer device is in the operative position assuring a smooth transfer of the compacted cope and drag into firm sliding engagement and guided relationship within the interior of the casting tube 94. At the completion of the pressing motion of the ejector, the pressure pad or ram 110 is again returned to the retracted position and the cylinder 84 is actuated whereby the transfer device returns to the load position as illustrated in FIG. 2. In that position subsequent movement of the conveyor 48 is effected to discharge the empty cope and drag flasks from the transfer device and replace it with a paired drag and cope flasks filled with sand and the operation is again repeated.

Referring back to FIG. 1, the empty cope and drag flasks are conveyed by the conveyor 48 in the direction of the arrows to a separator 118 which effects a disengagement of the two flasks and a return thereof to the input side of the drag molding machine and cope molding machine for refilling with green sand in a manner as previously described.

The apparatus hereinbefore described with modification, is equally applicable for effecting the rapid production of individual molds incorporating precision shell type cores which are transferred in a similar manner into the inlet end of a casting tube in accordance with the arrangement as illustrated in FIG. 5. In this arrangement drag flasks 120 which similarly are open ended mold boxes, are conveyed on a conveyor 122 into the input side of a drag molding machine 124. Pattern boards 126 mounted on the base of the machine are sequentially oriented with an overlying drag flask which in turn is filled with sand and compacted so as to provide a depression of a preselected configuration conforming to the pattern on the pattern board. The filled drag flask 120 is thereafter stripped from the pattern board and passes through an invertor or roll-over device 128 in which it is inverted 180° and thereafter is conveyed on a conveyor 130 along a core setting area as indicated in FIG. 5. In the core setting area, precision-type cores, subsequently to be described, are manually or mechanically inserted in the cavities of the filled drag flasks, which thereafter are conveyed to a transfer device 132 of the same construction as previously described in connection with FIGS. 2 and 3. The transfer device 132 effects a pressing of the drag and precision core out through the open end of the drag flask 120 and into the inlet end of a casting tube 133 in a manner as previously described. The empty drag flasks at the completion of the pressing operation are returned by the conveyor 122 to the input side of the drag molding machine for a refilling thereof with compacted green sand.

The specific construction of the individual molds is best seen in FIGS. 6 and 7. As shown in these two figures, a drag 134 of a compacted green sand is disposed with the periphery thereof in sliding bearing contact against the inner surface of the casting tube 133. One face of the drag 134 is disposed in firm abutting relationship against the adjacent face of a similar drag, forming a stacked series of molds within the pouring tube in which they are guidably and slidably disposed. In the exemplary embodiment shown in FIG. 6, the drag 134 is formed with a dish-shaped depression 136 extending inwardly from one face thereof which, in combination with the face of the adjacent mold, define an annular shoulder 138 in which a peripheral flange 140 of a precision thin-walled shell-type core 142 is seated and is disposed in appropriate registered relationship relative to the dish-shaped depression 136.

The drag 134 is further formed at its upper end as viewed in FIGS. 6 and 7 with a sprue which is adapted to be exposed through an elongated slot 144 provided along a portion of the upper surface of the casting tube 133. In the exemplary embodiment illustrated, the sprue extends downwardly into an arcuately-shaped gate 146 for distributing the molten metal along at least a portion of the periphery of a mold cavity 148 as defined by the opposing surfaces of the precision core and depression. The adjacent face of a second drag is preferably provided with a radially-extending depression or aperture 150 which is disposed in communication with the outer surface of the precision core and with the periphery of the drag for venting the interior of the mold. In accordance with a preferred embodiment of the present invention, the casting tube, as best seen in FIG. 7, is provided with a plurality of apertures or ports 152 in the wall thereof which are disposed in communication with a chamber 154 to which a subatmospheric pressure is applied. Accordingly, by this arrangement, gaseous products present, or produced during the casting operation, are quickly removed from the mold interior out through the aperture to the vacuum chamber, substantially enhancing the rapid filling of the mold cavity 148 and further assuring successive, accurate high-quality castings.

A further advantage of the mold construction as illustrated in FIGS. 6 and 7 is the permeability as provided by the shell-type core and the accurate surface contour of its face, defining a portion of the mold cavity. It is known that compacted green sand mixtures leave much to be desired with respect to their permeability characteristics, and, as a result, frequent entrapment of gaseous components occurs which detracts from the quality of the castings produced and substantially increases the scrap percentage of articles made. In accordance with the mold construction as illustrated in FIGS. 6 and 7, the use of a relatively permeable and accurate shell-type core substantially facilitates the escape of gaseous products from the mold cavities, while concurrently providing for a resultant surface finish requiring only minimal further machining.

In the specific mold constructions as illustrated in FIGS. 6 and 7, it will be noted that the surface of the shell-type core 142 defines the inner surface of a brake drum, whereas the surface defined by the drag represents the outer surface of the brake drum, which normally does not require further machining. The increased accuracy provided by the shell-type core necessitates only minimal machining operations to provide a true cylindrical surface necessary for satisfactory operation of wheel-type brakes.

Thin-walled, shell-type cores corresponding to the core 142, as shown in FIGS. 6 and 7, are manufactured by techniques well known in the art employing a sand or sand mixture incorporating from about 1% up to about 10% of a suitable sand binding agent. Sand binding agents of this type usually are selected from thermosetting resins, such as phenolaldehyde resins, urea formaldehyde resins, furfuryl resins, furfuryl aldehyde resins, etc., as well as mixtures and copolymers thereof. The sand mixture incorporating the thermosetting resin binder is conventionally applied to a heated pattern generally by blowing the sand binding mixture incorporating a suitable catalyst against the heated pattern. The heat of the pattern causes initiation of the curing reaction of the sand binding agent, whereby after a preselected time period, the sand shell is stripped from the pattern and either subjected to further curing or allowed to cool prior to further use. Precision-type cores made in accordance with the shell molding process well known in the art can be satisfactorily employed in the practice of the present invention for making various articles of different configuration and providing both the benefit of accuracy and permeability.

Regardless of whether a two-piece mold or an individual mold is employed for receiving the molten metal, the molds, upon entering the casting tube, are disposed in a stacked face-to-face abutting relationship and are intermittently advanced therethrough in response to the pressing of a new mold into the inlet end of the casting tube. Concurrently, upon the entry of an additional mold, a mold filled with metal is ejected from the outlet end of the casting tube. In order to provide greater accuracy and assure optimum alignment of the stacked molds relative to each other in the casting tube, the cross-sectional size of the casting tube is of a controlled smaller size than the peripheral size of the mold being pressed therein. This relationship is best illustrated in FIG. 8. As shown, the casting tube 133 is provided at its inlet end with a scraper blade or knife 156 for trimming the periphery of the drag 134 of an individual-type mold incorporating a precision shell-type core 142 in response to the inward movement of the mold. The pressing operation is achieved by the pressure pad 110 affixed to the piston rod 112, whereby the drag and core are concurrently ejected from the drag flask 120 disposed in appropriate alignment with respect to the inlet end of the casting tube. The shaving operation results in the trimming of excess sand particles as indicated at 158, whereby a substantially improved fit of the stacked molds is achieved within the casting tube.

While the molds are positioned in the casting tube of the apparatuses illustrated in FIGS. 1 and 5, molten metal is poured from a suitable ladle 160 through the sprues and into the cavities therein. The metal pouring operation can be achieved manually or automatically, as desired.

Due to the frictional resistance presented by the engagement of the periphery of the molds with the inner surface of the casting tube, the length of the casting tube is of necessity limited to enable intermittent advancement of the mold through the tubes without requiring excessive force which would effect a crushing, fracture or distortion thereof. In accordance with a further embodiment of the present inventoin, a second transfer device 162 is provided at the end of the casting tubes as illustrated in FIGS. 1 and 5, which is formed with a chamber 164 therein for receiving a mold 166 discharged from the outlet end of the casting tube when in aligned position relative thereto. The transfer device, as best seen in FIG. 9, is pivotally mounted on a shaft 168 extending longitudinally of the axis of the casting tube and is pivotable to and from a loading position as shown in solid lines in FIG. 9 to alternative unloading positions in which the chamber 164 and a mold 166 therein are aligned with the inlet ends of cooling tubes 170 extending in laterally offset parallel relationship relative to the casting tube.

When the transfer device is in either of the alternative unload positions as illustrated in FIG. 9, the mold 166 therein is pressed from the chamber 164 by means of ejectors 192, as shown in FIGS. 1 and 5, mounted along each side of the casting tube. Each of the ejectors 192 consists of a double-acting fluid-actuated cylinder 194 having a pressure pad 196 affixed to the end thereof and which is reciprocable to and from a retracted position as shown in solid lines in FIGS. 1 and 5 to a projected position in which the face of the pressure pad is disposed contiguous to the inlet end of the cooling tube.

Movement of the transfer device from the load position to the unload position is achieved by a double-acting transfer cylinder 172 having its blank end pivotally affixed to a bracket 174 and its piston rod 176 connected to a pin 178 on the transfer member disposed in spaced relationship relative to the axis of the shaft 168. Appropriate registration of the chamber and mold of the transfer device with the inlet ends of the cooling tube is achieved by mechanical stops 180 affixed to each cooling tube, which are adapted to coact with pressure pads 184 affixed to each side of the transfer device. Orientation of the transfer device relative to the load or upright position, as shown in FIGS. 1, 5 and 9, can be suitably achieved by a limit switch 186 which, upon actuation, is operative to de-energize further movement of the piston of the transfer cylinder 172.

As best seen in FIG. 9, the cooling tubes 170 are preferably of a hollow-walled construction defining a chamber 188 into which a suitable cooling fluid, such as air or water, can be circulated for enhancing the rate of cooling of the mold. The cooling fluid can suitably be introduced into the chamber 188 by means of conduits 190 disposed in communication with the interior of the chambers and connected to a suitable source of cooling fluid. The passage of cooling fluid is preferably done in a counter current flow.

The molds, upon being ejected from the end of the cooling tubes, are handled in a conventional manner whereby the castings are extracted from the molds and the usable sand is recycled back to the drag and cope molding apparatus for mixture for fresh makeup for reuse.

While it will be apparent that the invention herein disclosed is well calculated to fulfill the objects above stated, it will be appreciated that the invention is susceptible to modification, variation and change without departing from the proper scope or fair meaning of the subjoined claims.

What is claimed is:

1. An apparatus for making castings comprising molding means for successively feeling sand into open-ended flasks forming molds having cavities therein of a preselected pattern, an open-ended elongated casting tube having an inlet end and an outlet end and adapted to guidably support a plurality of said molds disposde in face-to-face abutting relationship, transfer means for successively positioning each of said flasks in axial alignment with said inlet end of said casting tube, ejection means for successively pressing a mold from an aligned flask into said inlet end of said casting tube and for concurrently ejecting a mold from said outlet end thereof, means for delivering molten metal into said cavity of each said mold while disposed in said casting tube, and means for applying subatmospheric pressure peripherally of said molds while disposed in said casting tube for extracting gaseous products generated during the filling of the mold cavities with molten metal.

2. The apparatus as described in claim 1, wherein said casting tube is of a cross-sectional size less than the cross-sectional size of said mold and wherein said inlet end is formed with cutting means for trimming said mold in response to the inward movement of said mold by said ejection means.

3. The apparatus as described in claim 1, further including an open-ended cooling tube adapted to guidably support a plurality of filled said mols in face-to-face abutting relationship, and second transfer means for transferring a mold ejected from said outlet end of said casting tube into one end of said cooling tube.

4. The apparatus as described in claim 1, wherein said transfer means comprises a transfer device and conveying means for transporting said flasks to and from said transfer device, said transfer device comprising a frame including engaging means thereon for retaining a flask in fixed position, said frame movable to and from a loading position for receiving and discharging flasks from and to said conveying means and an operative position in which said flask is disposed in axial alignment with said inlet end of said casting tube, and coacting means for aligning said frame with said casting tube when in said operative position.

5. The apparatus as described in claim 4 further characterized in that said injection means are mounted on said frame for pressing said mold from said flask into said inlet end of said casting tube when said transfer device is in said operative position.

6. The apparatus as described in claim 4 further characterized in that said frame is pivotally mounted for tilting movement between said load position and said operative position angularly spaced therefrom.

7. The apparatus as described in claim 3, further including a plurality of cooling tubes to which said molds are alternatively transferred from the outlet end of said casting tube by said second transfer device.

8. The apparatus as described in claim 3, wherein said second transfer device comprises a member formed with a chamber therein for removably receiving said molds from said outlet end of said casting tube when in a receiving position, said member movable to and from said receiving position in alignment with said outlet end to a discharge position in alignment with one end of said cooling tube, and second ejection means for transferring said mold from said chamber into said cooling tube.

9. The apparatus as described in claim 1, wherein said ejection means comprise a reciprocable plunger and a pressure pad thereon for abutting one face surface of said mold for pressing said mold outwardly of said flask.

10. The apparatus as described in claim 1, in which said mold comprises a cope and a drag disposed in paired face abutting relationship and defining therebetween said cavity of said preselected pattern.

11. The apparatus as defined in claim 10, wherein apertures are formed between the mating faces of said cope and said drag disposed in communication with said cavity and the periphery of said mold for applying subatmospheric pressure to said cavity when said mold is disposed in said casting tube.

12. The apparatus as defined in claim 1, wherein said mold comprises a drag of a compressed green sand mixture and a core overlying at least a portion of one face surface of said drag with the opposing surfaces thereof defining therebetween said cavity, said core comprising a thin-walled shell of a bonded sand mixture.

13. The apparatus as defined in claim 12, in which one face surface of said drag is formed with indentations therein for removably receiving and accurately positioning said core in appropriate registry relative to said drag.

References Cited
UNITED STATES PATENTS

| | | | |
|---|---|---|---|
| 956,638 | 5/1910 | Hoffer | 249—129 X |
| 3,008,199 | 11/1961 | Jeppesen | 164—22 |
| 3,068,537 | 12/1962 | Fellows | 164—324 X |

J. SPENCER OVERHOLSER, Primary Examiner

J. S. BROWN, Assistant Examiner

U.S. Cl. X.R.

164—324, 339, 65